United States Patent [19]

Kobayashi et al.

[11] Patent Number: 5,033,038
[45] Date of Patent: Jul. 16, 1991

[54] AUTOMATIC DISK EXCHANGE DEVICE

[75] Inventors: Takashi Kobayashi, Yokohama; Tsurayuki Sugiyama, Tokyo, both of Japan

[73] Assignees: NKK Corporation, Tokyo; Kabushiki Kaisha Nikkyo Seisakusho, Matsudo, both of Japan

[21] Appl. No.: 269,475

[22] Filed: Nov. 9, 1988

[30] Foreign Application Priority Data

Jul. 21, 1988 [JP] Japan .................. 63-180200

[51] Int. Cl.⁵ .............................. G11B 17/22
[52] U.S. Cl. ........................ 369/36; 369/34; 369/38
[58] Field of Search ............ 369/38, 36, 37, 34

[56] References Cited

U.S. PATENT DOCUMENTS 4,561,078 12/1985 Nakayama .................. 369/38
4,817,071 3/1989 Carlson et al. ............. 369/36
4,853,916 8/1989 Tomita ...................... 369/36

Primary Examiner—Stuart S. Levy
Assistant Examiner—Kenneth B. Wells
Attorney, Agent, or Firm—Thomas H. Whaley

[57] ABSTRACT

The present invention is concerned with an improved automatic disk exchange device which is adapted to take out a selected one of a plurality of disks housed within a disk housing device by a transport device and to introduce the disk into and attach the disk to a recording/reproducing device, where the information is recorded on the disk or reproduced from the disk, the disk now attached to the recording/reproducing device being then taken out of the recording/reproducing device so as to be again housed in the housing device. The invention permits shortening of the distance through which the disk is moved within the automatic disk exchange device and reduces the number of operations accompanying the disk movement and the disk access time.

3 Claims, 4 Drawing Sheets

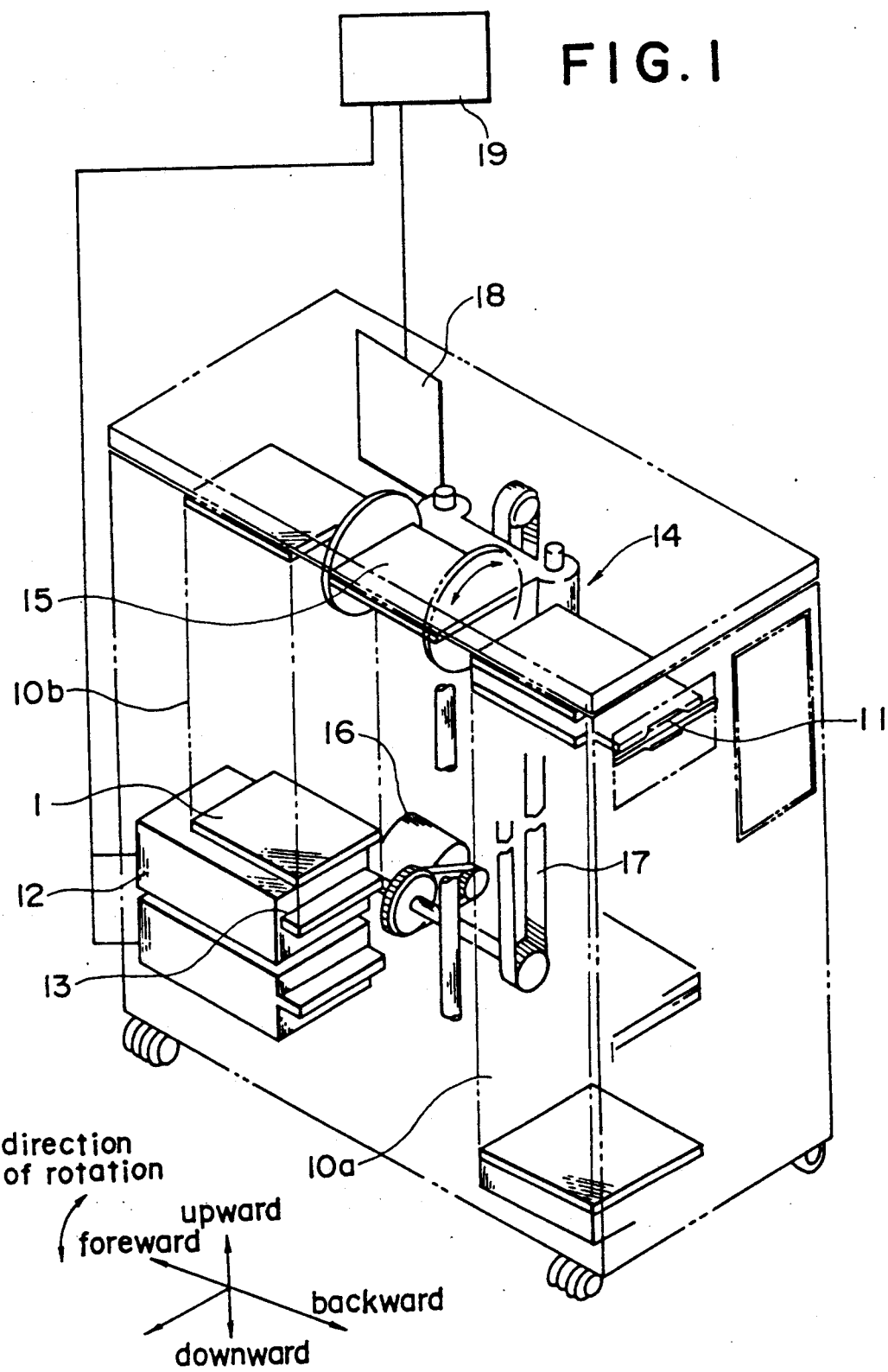

(b)

AUTOMATIC DISK EXCHANGE DEVICE

BACKGROUND OF THE INVENTION

1. Field of the Invention

This invention relates to an improved automatic disk exchange device in which a large number of disks are stores in a disk storage device, one of the selected disks is automatically taken out of the storage space by a transport mechanism when required and transferred and attached to a recording/reproducing device for recording and/or reproducing the information, and in which the disk thus attached to the recording/reproducing device is again transported therefrom for storage to the disk storage device.

2. Description of the Prior Art

The automatic disk exchange device of the type described above is disclosed for example in the Japanese Patent Provisional Publication No. 24 3865/1985 and illustrated in FIG. 3 as a well-known automatic disk exchange device.

In this figure, the reference numeral 1 denotes a disk contained in a square sheet-like cassette hereinafter referred to simply as a disk, the reference numeral 2 a disk storage device in the form of a bookcase for storing the disks 1 in the upright position, the reference numeral 3 a recording/reproducing device, the reference numeral 4 a transport device disposed at the backside of the storage device 2, and the reference numeral 5 a transport frame provided to the transport device 4 and having a built-in transfer means adapted for transferring the disk 1.

In operation, when a selected one of the disks 1 in the storage device 2 is attached to the recording/reproducing device 3, the transport device 4 is driven into operation for shifting the transport frame 5 to a position facing to the selected disk 1 stored in the storage device 2 both transversely or along the x-axis and vertically or along the z-axis. When the transport frame 5 reaches a predetermined position, the transverse transfer unit transfers the disk out of the storage device 2 into the transport frame 5. The transport frame is then turned 90° and moved downward to the position of the recording/reproducing unit 3. The transfer unit is then driven in the reverse direction for transporting the disk 1 by way of an inlet/outlet port 6 into the inside of the recording/reproducing unit 3. When the disk 1 has been transported into and attached in position within the recording/reproducing unit 3, the recording/reproducing device is ready to start the recording/reproducing operation.

When the operation of recording the information on or reproducing the information from the disk 1 by the device 3 is terminated, the disk 1 is transported and returned to the original storage device by the operation reverse to what is described above.

In the prior-art method, as described above, there is employed a system of a construction in which the disks are housed in the upright position in the storage device 2 in the form of a bookcase and in which the recording/reproducing device provided with the horizontally extending inlet/outlet port disposed under the storage device 2.

Such a construction has, however, the following drawbacks (i) to (iv):

(i) The operation of taking a disk out of the storage device and attaching it in position in the recording/reproducing device is time-consuming. That is, the disk transport operation usually takes three to four seconds, while the disk position changing operation usually takes about one second, such that the total disk access time is four to five seconds. If the disk is housed at a position in the storage device remote from the recording/reproducing device, the transport time is correspondingly increased.

(ii) The transport device including the transfer unit performs a three-dimensional motion, to which a rotary motion is added to effect the position changing of the disk, so that the structure is complicated and naturally susceptible to troubles.

(iii) The disk storage space efficiency is low and the overall construction tends to be increased in size.

(iv) The transport frame is supported at one point by a rotary shaft in a cantilevered fashion and increased in weight because of the built-in transfer means, thus necessitating the weight counterbalancing means such as two springs as shown. In addition, a large-sized electric motor capable of developing a larger output needs to be provided as a driving source.

This results in a more complicated structure of the overall construction with the increased rate of trouble occurrence and the increased production costs.

OBJECT AND SUMMARY OF THE INVENTION

It is therefore a principal object of the present invention to overcome the above deficiencies of the prior-art construction and to provide a disk exchange device which is compact in size and light in weight and which has a short access time and a high operational reliability despite its simple construction.

SUMMARY OF THE INVENTION

For accomplishing the above object, the present invention provides an automatic disk exchange device including a disk transport device movable vertically as it holds the disk in the horizontal position and capable of rotating the disk, a disk storage device disposed across the disk transport device and adapted for storing a plurality of disks in the horizontal position, and a recording/reproducing device provided below the disk storage device and adapted for recording the information on or reproducing the information from the disk as it is held in the horizontal position, said disk being adapted to be shifted both vertically along the Z-axis or transversely along the y-axis and also adapted to be rotatable.

In the automatic disk exchange device of the present invention, the disk is stored or shifted at all times in the horizontal position and is not changed in its position, so that the time involved in transporting the disk is reduced, such that the mean access time for the disk, that is, the time that elapses since the disk is taken out of the storage device until it is mounted in position in the recording/reproducing device, is about two seconds, which means a significant reduction as compared to the access time of four to five seconds of the prior-art system.

The disk to which the present invention is applied is not limited to the WORM type disk shown herein but may be extended not only to an optical disk, such as the compact disk, CD-ROM and erase type disk, but to a magnetic hard disk or a magnetic floppy disk.

The disk size also is not limited to 13.34 cm (5.25 inch) but the disk size of 20.32 cm (8 inch) or 30.48 cm (12 inch) may be employed in the present system.

Briefly, the following advantages are derived from the construction of the present invention.

(i) The distance traversed by the disk and the operation accompanying the movement are reduced, so that the disk access time is reduced to about two seconds, which means a reduction of one half as compared to that of the prior-art system.

(ii) The construction is simplified, production costs are lowered and the device is less susceptible to operational troubles or failures.

(iii) The disk storage space efficiency is improved and the overall device is reduced in size and weight.

BRIEF DESCRIPTION OF THE DRAWINGS

FIG. 1 is a perspective view showing an automatic disk exchange device according to an embodiment of the present invention.

DETAILED DESCRIPTION OF THE PREFERRED EMBODIMENTS

Figure 2A:
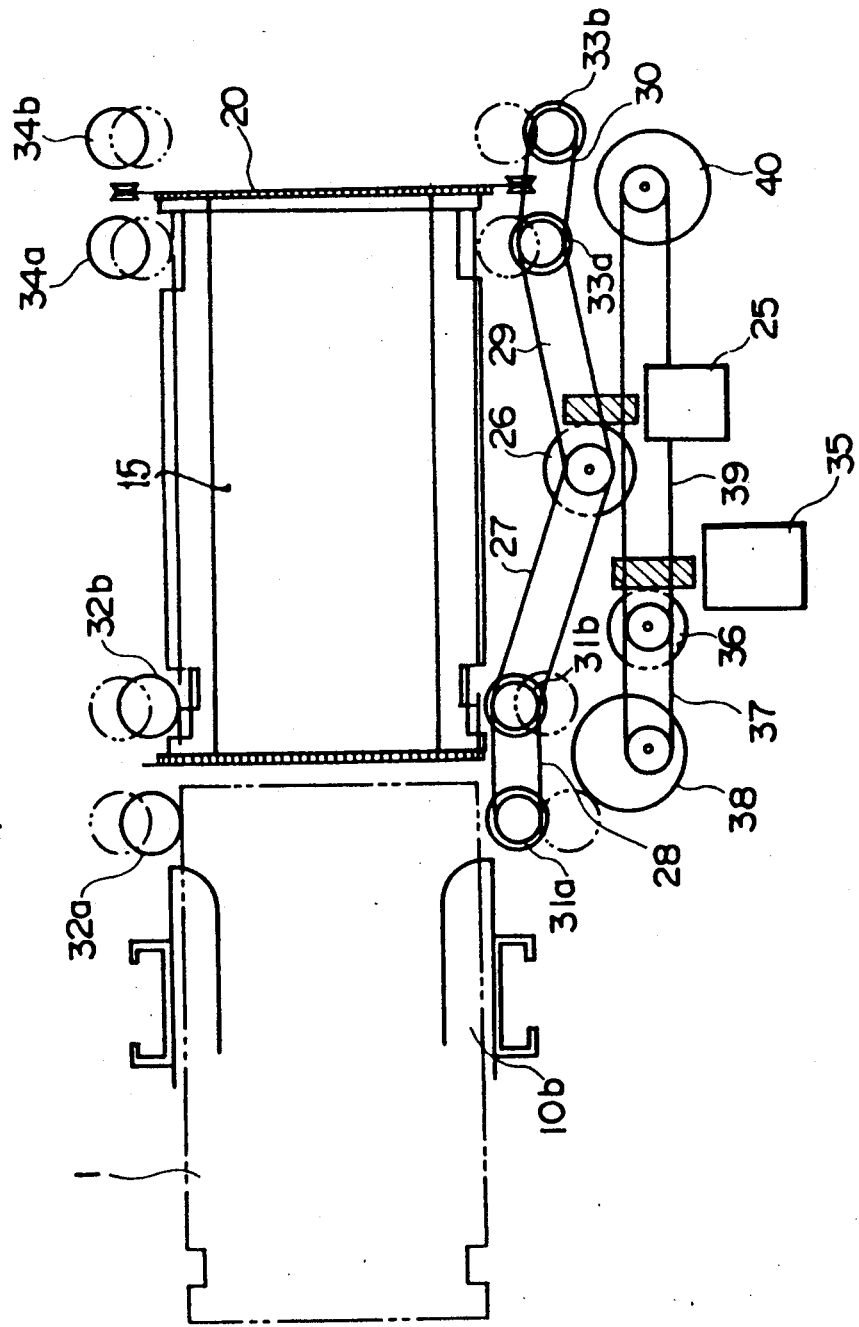
FIG. 2a is a plan view of a disk holder, shown partly in section.
Figure 2:
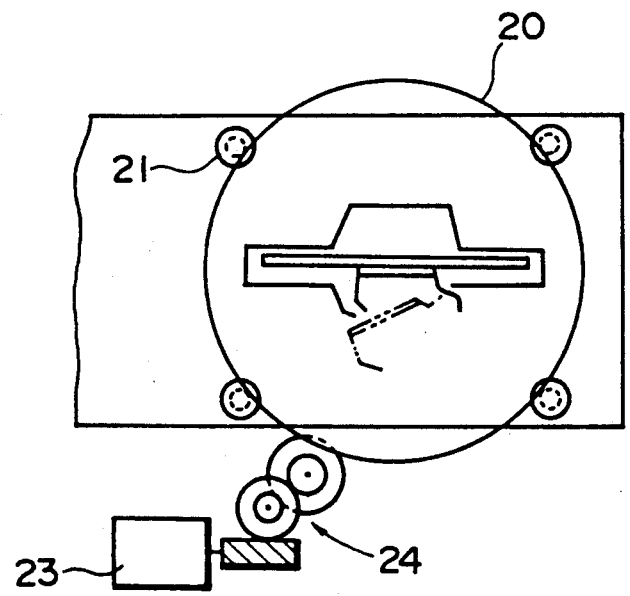
FIG. 2b is a side view of the disk holder.
Figure 3:
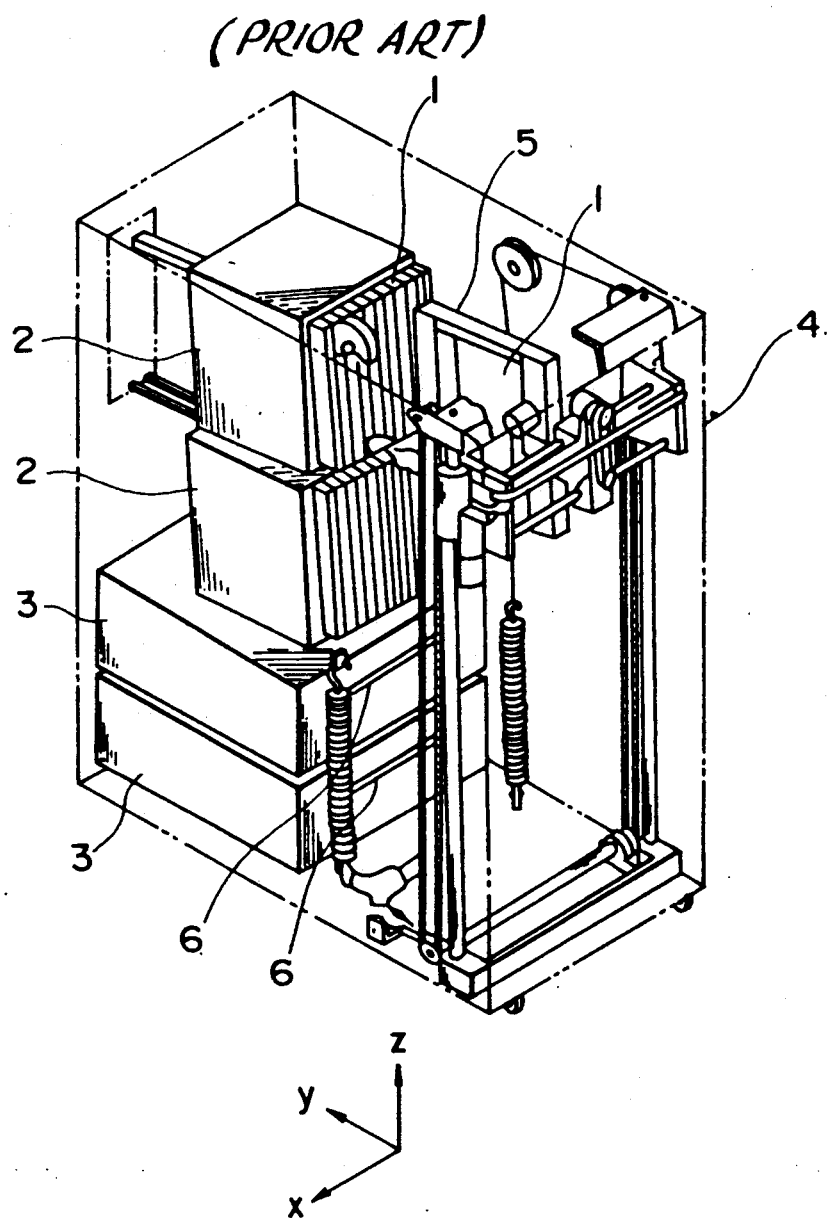
FIG. 3 is a perspective view showing a conventional automatic disk exchange device.

An automatic disk exchange device according to a preferred embodiment of the present invention is shown in perspective in FIG. 1, wherein the reference numeral 1 denotes a disk and the reference numerals 10a, 10b denote disk shelves. The reference numerals 11, 12, 13, 14, 15, 16, 17, 18 and 19 denote a disk exchange window, a recording/reproducing device, a disk inlet/outlet port, a disk transport device, a disk holder, a drive unit, a transmission belt, a controller and a CPU, respectively.

As shown in the figure, the automatic disk exchange device according to the present invention is comprised of the disk shelves 10a, 10b for horizontally accommodating the disks 1 each in a cartridge, i.e., a square sheet-like container or cassette, the recording/reproducing device 12 for recording the information on the disk 1 and reproducing the recorded information from the disk, and the disk transport device 14 for taking one of the preselected disks out of the shelf 10a or 10b and attaching it to the recording/reproducing device 12, or taking one of the preselected disks out of the recording-/reproducing device 12 and re-housing it into the shelf 10a or 10b. The disks 1 are held in the horizontal position while they are stored, subjected to a recording or reproducing operation, or are in transit.

The present automatic disk exchange device is 300 mm in width, 700 mm in height and 700 mm in depth and houses 60 sheets of direct read postscript type optical disks each 13.34 cm (5.25 inch) in diameter, the drive unit and the recording/reproducing device.

The disk transport device 14 includes a disk holder 15, a support member 22, a drive unit 16 and a drive belt 17 and is movable vertically by the drive unit 16 while being adapted for transporting the disks in the transverse direction for transporting the disks into and out of the shelves 10a, 10b. The disk holder 15 is structured so as to be rotatable for presenting the observe and reverse of the disk 1 as desired.

The controller 18 is formed by a 8-bit microprocessor.

FIGS. 2a and 2b show the disk gripper of the disk transport 14 in a plan view and a side elevational view, respectively. The disk gripper 15 is provided on its both ends with a rotational drum 20 that is supported by rotational guide rollers 21, and is driven into rotation by an electric motor 23 and a rotational drive unit 24. For transferring the disk 1 between the shelves 10a, 10b and the disk holder 15, gripper rollers 31a, 31b, 32a, 32b, 33a, 33b, 34a and 34b, provided on the disk holder 15, are employed. That is, a motor 35 drives cams 38 and 40 through a gear 36 and belts 37 and 39, but those cams 38 and 40 have phases shifted by 180 degrees from each other, thereby to prescribe positions of the gripper rollers 31a, 31b and 33a, 33b by the rotational angle thereof. Besides, the rollers 31a, 31b and 33a, 33b are driven into rotation by a motor 25 through a gear 26 and belts 27 and 29. The rollers 32a, 32b and 34a, 34b are driven into rotation in a similar manner by a mechanism not shown.

As illustrated in FIG. 2a, the disk exchange device comprises a main rocker arm 27, 29 on one side of the disk transport device and an extension arm 28, 30 connected with each of said main rocker arms and a pair of rollers 31a, 31b, 33a, 33b, mounted on each of said extension arms. Rollers 31a, 31b, 33a and 33b are driven by belts 27, 29. A pair of cams 38, 40, are simultaneously rotated 180 degrees out of phase with one another by belt 37 to selectively press the rollers 31a, 31b, 33a, 33b on the extension arms and idler rollers 32a, 32b, 34a, 34b, into contact with a selected disk cartridge thereby transferring the disk cartridge into or out of the disk transport device.

As described above, two sets of driving side gripper rollers 31a, 31b and 33a, 33b including as one set two gangs, the positions of which are prescribed by the cams 38 and 40 and two sets of follower side rollers 32a, 32b and 34a, 34b including as one set two gangs driven by means of cams in a similar manner through a link mechanism (not shown) and opposing 31a, 31b and 33a, 33b perform gripping operation of the disk 1 by one pair left and right, viz., 31a, 31b and 32a, 32b on the left side and 33a, 33b and 34a, 34b on the right side, and said gripping operation has the following three patterns.

i) The right hand side rolls are gripping the disk while the left hand side rolls are open, for transferring the disk into or out of the transport device at the right hand side;

ii) the left hand side rolls are gripping the disk while the right hand side rolls are open, for transferring the disk into or out of the transport device at the left hand side; and iii) both the left and right hand side rolls are open, the disk being thus held or not held in the transport device.

One of these positions can be selected by a sensor and a flag, not shown, provided with three slits.

Referring to FIG. 1, a CPU 19 is provided on top of the present exchange device and adapted to command the controller 18 and the automatic disk exchange device to perform a variety of mechanical operation such as loading, unloading or exchange of the disks 1, as well as to perform recording and reproduction of the information on and from the disks 1. The controller 18 is adapted to communicate with the CPU 19 to cause the mechanical system to perform predetermined mechanical operations.

In operation, when the disk 1 housed within the shelf 10a 10b is selected the drive unit 16 is driven into operation and the transmission belt 17 is thereby driven into operation to raise or lower the disk holder 15 to a selected shelf position. The gripper rollers 31a, 31b; 32a, 32b of the disk holder 15 are then actuated to grip the disk 1 within the shelf 10a. The disk 1 thus gripped is then introduced into the disk holder 15 by the introducing operation and then the disk holder is lowered to the height position of the recording/reproducing device 12. Since not only the obverse side but also the reverse side of the disk 1 is usable, the disk holder 15 is rotated about its horizontal axis 180°, if necessary, under the commands of the controller 18, so that the desired disk surface will be directed upwards. The gripper 15 then actuates the disk holder rollers 31 to 34 in such a manner that the disk 1 is discharged out of the disk holder and inserted at the inlet/outlet port 13 of the recording/reproducing device 12. It is noted that, when the disk 1 contained in the shelves 10a or 10b is introduced and housed within the recording/reproducing device 12, the disk 1 is introduced from the shelf 10a into the disk holder 15 from the left or right hand side and discharged into the recording/reproducing device 12 from the right-hand side of the gripper 15. The disk 1 is introduced into the recording/reproducing device 12 with the aid of an introducing/discharging device, not shown, which is contained within the recording/reproducing device 12. After the disk 1 is attached to the recording/reproducing device 12, the recording and/or reproducing operation is performed on and/or from the disk.

When the disk 1 is to be taken out of the recording/reproducing device 12 and returned into and housed within the shelves 10a or 10b, after the termination of the recording or reproducing operation on or from the disk 1, the introducing and discharging device contained in the recording/reproducing device 12 is actuated for discharging the disk out of the device 12 and holding the discharged disk. The disk holder 15 is then lowered to the height level of the recording/reproducing device 12. The gripper rollers 31 to 34 of the disk holder are then actuated for introducing and housing the disk 1 within the holder 15. Then, under the commands of the controller 18, the gripper 15 is raised to a predetermined height level and the gripper rollers 31 to 34 are actuated to return the disk into the shelves 10a or 10b to terminate the disk returning operation.

When the used-up disk 1 contained within the shelves 10a, 10b is to be exchanged with a new one, the disk holder 15 is lowered to a height position of the used-up disk 1 accommodated within the shelves 10a or 10b. The disk 1 is then introduced into the disk holder 15 which is then raised to the height level of the disk exchange window 11, through which the used-up disk 1 contained in the disk holder 15 is discharged to the outside through the disk discharge window. The operator then takes out the used-up disk 1 and introduces a new disk 1 through the exchange window 11. The disk holder 15 is then caused to perform an operation, which is the reverse of the above described operation, for accommodating the new disk 1 at a predetermined position within the shelves 10a or 10b.

What is claimed is:

1. In an automatic disk exchange apparatus for recording information on a disk and reproducing information recorded on a disk, the improvement comprising:
   a disk gripper provided with a disk access opening and rotational drum at each end for inserting and removing a disk cartridge into and out of its either end in the horizontal position and for rotation of the disk gripper about its horizontal axis;
   a disk transport device for transporting said disk gripper along a vertical path to a predetermined position;
   means for rotating said disk gripper on its horizontal axis;
   vertically stacked disk housing means provided at both sides of said disk gripper and said disk transport device and adapted for housing a plurality of disks in the horizontal position;
   a recording/reproducing means provided below said disk housing means and adapted for recording information on or reproducing recorded information from said disks; and
   a disk exchange device for exchanging disks between said disk gripper and said disk housings and between said disk gripper and said information recording/reproducing means, said exchange device comprising rollers adapted to frictionally engage both sides of said disk cartridges simultaneously while supporting sand driving the disk cartridge to and from the disk gripper during exchange operations.

2. An automatic disk exchange apparatus according to claim 1 wherein said disk housing means comprises stacks on opposite sides of said disk griper for housing a plurality of disk cartridges and said disk gripper is adapted for removal of said disk cartridges from and delivery of said disk cartridges to either of said stacks.

3. An automatic disk exchange apparatus according to claim 1 comprising a disk exchange device for mutually exchanging disk cartridges between said disk gripper and said disk housing means and between said disk gripper and said exchange device a comprising main rocker arm provided on a side of said disk transport device and an extension arm connected with each of said main rocker arms and a pair of rollers mounted on each of said extension arms, means for driving said rollers, and means consisting of a pair of cams simultaneously rotatable 180 degrees out of the phase with one another to selectively press the rollers on the extension arms at one end of the main rocker arms against the edges of a selected disk cartridge, and means for rotating said cams to selectively engage the selected disk.

* * * * *